(12) United States Patent
Wang

(10) Patent No.: US 12,269,909 B2
(45) Date of Patent: Apr. 8, 2025

(54) POLYMER COMPOSITION AND A METHOD OF PREPARING A POLYMER RESIN

(71) Applicant: AGENCY FOR SCIENCE, TECHNOLOGY AND RESEARCH, Singapore (SG)

(72) Inventor: FuKe Wang, Singapore (SG)

(73) Assignee: AGENCY FOR SCIENCE, TECHNOLOGY AND RESEARCH, Singapore (SG)

( * ) Notice: Subject to any disclaimer, the term of this patent is extended or adjusted under 35 U.S.C. 154(b) by 736 days.

(21) Appl. No.: 17/413,120

(22) PCT Filed: Dec. 17, 2019

(86) PCT No.: PCT/SG2019/050618
§ 371 (c)(1),
(2) Date: Jun. 11, 2021

(87) PCT Pub. No.: WO2020/130941
PCT Pub. Date: Jun. 25, 2020

(65) Prior Publication Data
US 2022/0041781 A1 Feb. 10, 2022

(30) Foreign Application Priority Data
Dec. 17, 2018 (SG) .............. 10201811299X

(51) Int. Cl.
*C08F 236/20* (2006.01)
*C08K 5/05* (2006.01)

(52) U.S. Cl.
CPC .............. *C08F 236/20* (2013.01); *C08K 5/05* (2013.01)

(58) Field of Classification Search
None
See application file for complete search history.

(56) References Cited

U.S. PATENT DOCUMENTS

| 8,891,038 B2 * | 11/2014 | Coggio | ............... G02B 6/0056 |
| | | | 349/64 |
| 9,944,805 B1 | 4/2018 | Liu et al. | |
| 2005/0187308 A1 | 8/2005 | Park et al. | |
| 2012/0026431 A1 | 2/2012 | Coggio et al. | |
| 2015/0138289 A1 * | 5/2015 | Iijima | ............... B41J 11/00214 |
| | | | 347/102 |

FOREIGN PATENT DOCUMENTS

WO WO-2006/064431 A2 6/2006

OTHER PUBLICATIONS

Kawakami et al., "Design of High Performance Holographic Gratings Using Siloxane-containing Mesogenic Compounds", Pure and Applied Chemistry, Jan. 1, 2006, vol. 78, No. 10, pp. 1835-1842.
Search Report in International Application No. PCT/SG2019/050618 dated Feb. 14, 2020, 3 pages.
International Preliminary Report on Patentability and Written Opinion in International Application No. PCT/SG2019/050618 dated Apr. 16, 2021, 36 pages.

* cited by examiner

*Primary Examiner* — Sanza L. McClendon
(74) *Attorney, Agent, or Firm* — MARSHALL, GERSTEIN & BORUN LLP

(57) ABSTRACT

There is provided a polymer composition comprising at least one (meth)acrylate monomer or oligomer, a phase separating agent, a photoinitiator and a photosensitizer. There is also provided a method of preparing a polymer resin comprising the step of polymerizing a solution of at least one (meth) acrylate polymer or oligomer, a photoinitiator, a photosensitizer and a phase separating agent in the presence of UV light to form the polymer resin. There is also provided a polymer resin and uses of the polymer composition.

17 Claims, 3 Drawing Sheets

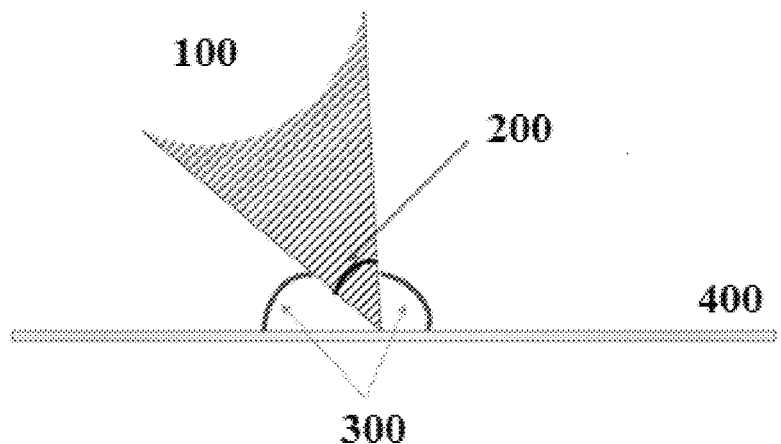
[Fig. 1]
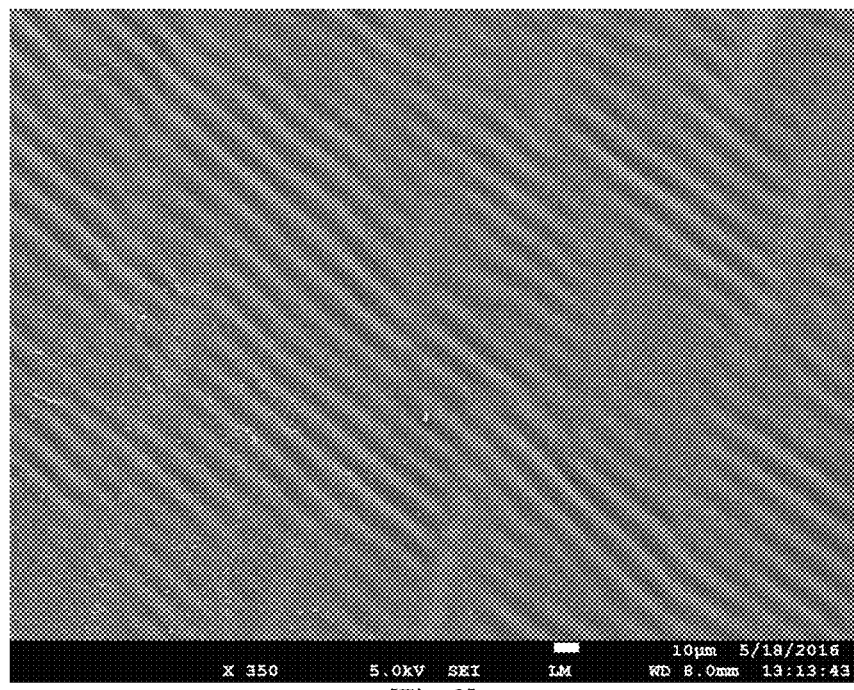
[Fig. 2]

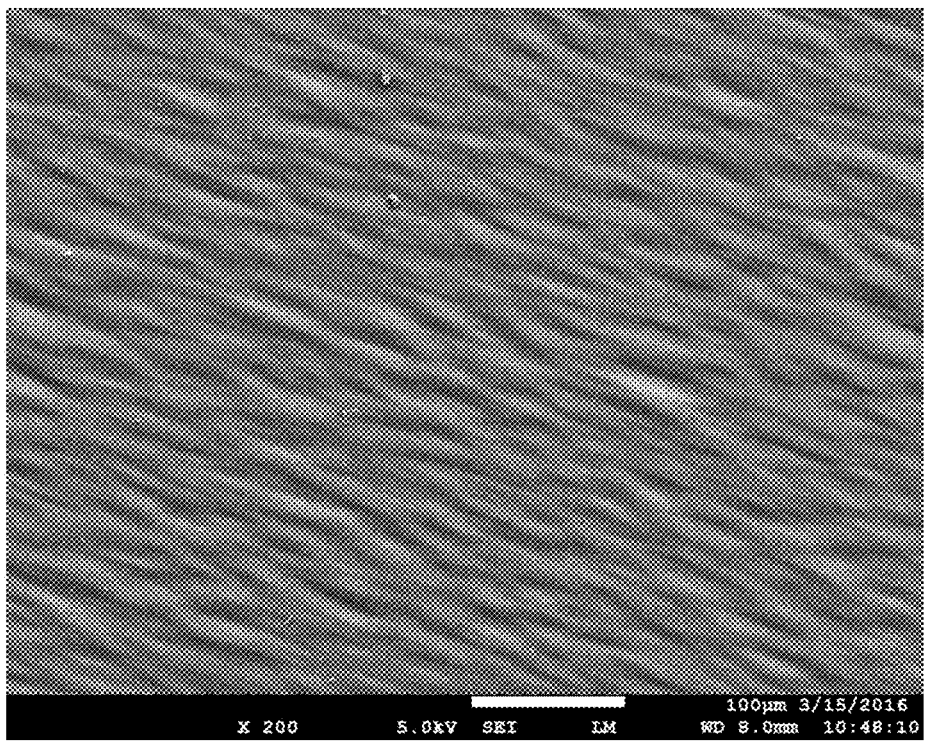
[Fig. 3]
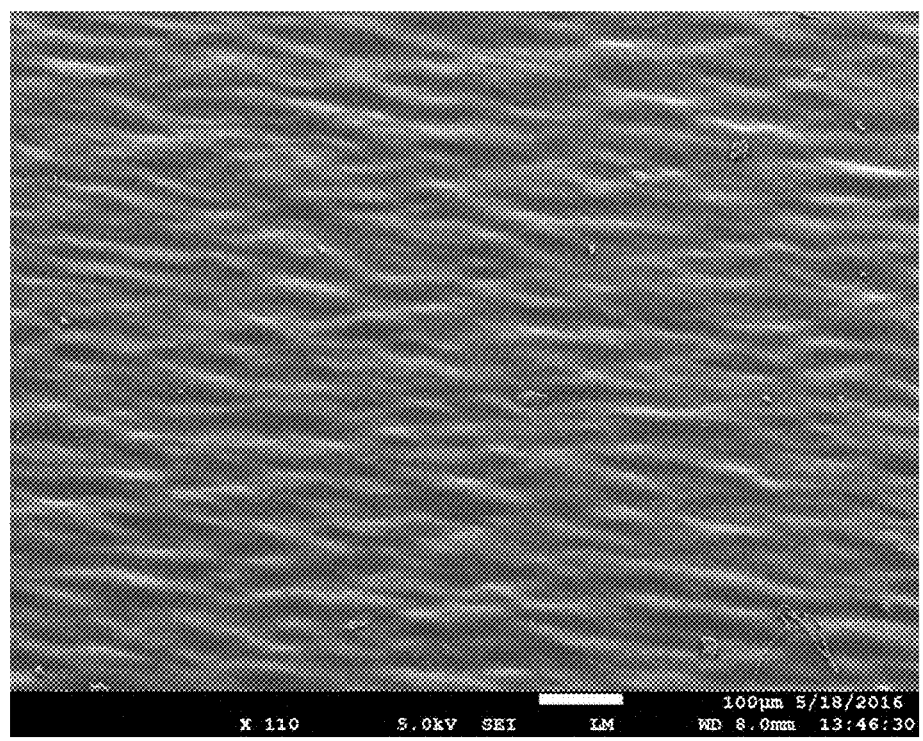
[Fig. 4]

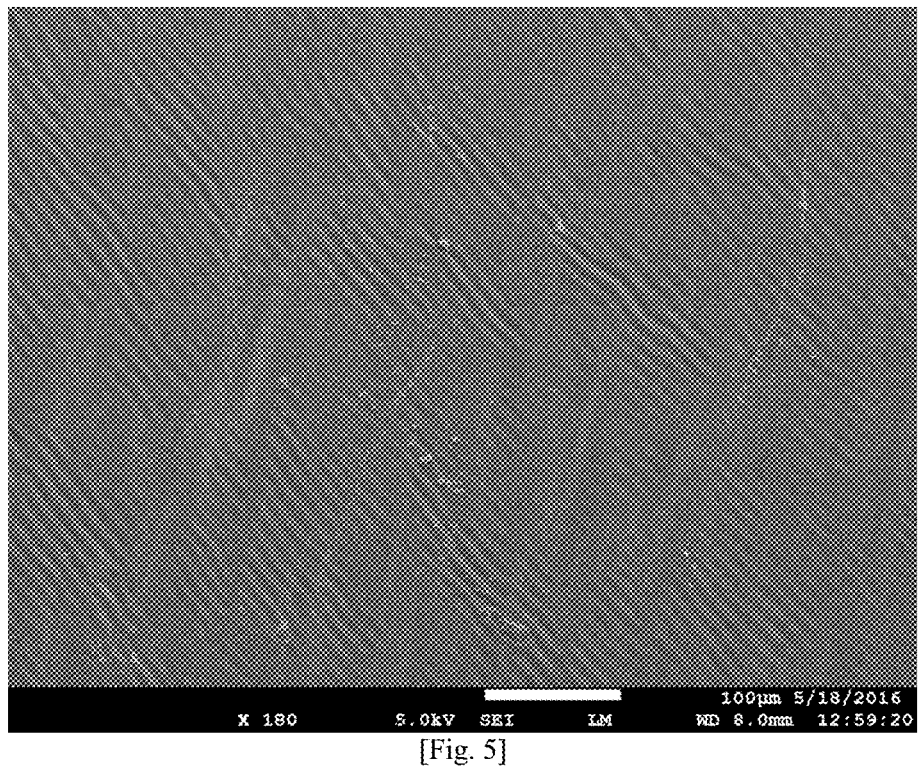
[Fig. 5]

POLYMER COMPOSITION AND A METHOD OF PREPARING A POLYMER RESIN

REFERENCES TO RELATED APPLICATIONS

This application claims priority to Singapore application number 10201811299X filed on 17 Dec. 2018, the disclosure of which is hereby incorporated by reference.

TECHNICAL FIELD

The present invention relates to a polymer composition and uses of the same. The present invention also relates to a polymer resin and method of preparing the same.

BACKGROUND ART

Light control polymer films can be used in a variety of light control applications. For example, light control polymer films can be switched from dark to transparent and applied in electronic information displays, signs, room dividers, and solar energy control in buildings and automobiles. Recently, polymer films with broadband angular selectivity such as laminating louvered plastic films have been widely used in privacy screen and green window film. The most popular technique to create the angular selective polymer film is to use micro-louvers. For example, commercial privacy film had been developed by laying opaque plastic louvers between strips of clear polymer films. By aligning the vertical configuration of the micro-louvers, light intensity across the privacy screen varies along the horizontal plane when viewed from a single reference point in front of the screen. The micro-louvers deflect more light at the side portions of the privacy screen than at a central portion of the screen. In this manner, the light control film can be used to provide privacy to a user who has documents containing sensitive material.

The light control polymers can also be used in lenses for goggles to be worn where high levels of illumination or glare are encountered. Light control films can also be used in window treatments to help improve the comfort, energy efficiency and appearance of the room.

However, as the micro-louvered layers are thin polymer films, they are subject to distortion from physical stress and temperatures. Moreover, the skiving by which the louvered plastic films are produced results in irregular surfaces, which prevents the skived plastic films from transmitting a clear optic image. Mostly importantly, the process of laminating louvered plastic films between two clear films requires an expensive press, and the resulting laminates cannot be larger than the platens of the press machine in which they are laminated. Thus the aforementioned disadvantages limit the applications of the privacy film. Therefore, there is a need to develop a polymer composition and a method of producing a polymer resin that will overcome, or at least ameliorate, one or more of the disadvantages described above and broaden their applications.

SUMMARY

There is provided a polymer composition comprising at least one (meth)acrylate monomer or oligomer, a phase separating agent, a photoinitiator and a photosensitizer.

In one aspect, the present disclosure refers to a polymer composition comprising: at least one (meth)acrylate monomer or oligomer; a phase separating agent; a photoinitiator; and a photosensitizer, wherein the weight percent ratio of the sum of said (meth)acrylate monomer(s) or oligomer(s), said phase separating agent, said photoinitiator and said photosensitizer is in the range of 90:4:1:0.1 to 60:30:1:0.1.

Advantageously, the polymer composition may be used to form a porous polymer resin with broadband angular selective properties by in-situ photopolymerization. The polymer resin may be formed when the polymer composition is polymerized. Therefore, in another aspect, there is provided a polymer resin comprising a polymerized polymer composition, wherein the polymer composition is as defined herein.

In another aspect, the present disclosure refers to a polymer resin comprising a polymerized polymer composition, wherein the polymer composition is as defined in any one of claims 1 to 14, wherein the polymer resin has a translucent angle tunable freely in the range of 5° to 175°, wherein said translucent angle refers to the angle which an object appears translucent or blur when seen through said polymer resin.

Advantageously, the polymer resin may have a translucent angle in the range of about 5° to about 40° and a corresponding view angle in the range of about 120° to about 175°. The polymer resin may be useful in light-collimating film applications such as privacy film.

Further advantageously, the polymer resin may have various degrees of transparency, such as full transparency, semi-transparency and total opacity, which may be useful in areas of coatings and 3D printing.

There is provided a method of preparing a polymer resin comprising the step of polymerizing a solution of at least one (meth)acrylate polymer or oligomer, a photoinitiator, a photosensitizer and a phase separating agent in the presence of UV light to form the polymer resin.

In another aspect, the present disclosure refers to a method of preparing a polymer resin comprising the step of polymerizing a solution of a least one (meth)acrylate monomer or oligomer, a photoinitiator, a photosensitizer and a phase separating agent in the presence of UV light to form the polymer resin, wherein the weight percent ratio of the sum of said (meth)acrylate monomer(s) or oligomer(s), said phase separating agent, said photoinitiator and said photosensitizer is in the range of 90:4:1:0.1 to 60:30:1:0.1.

Advantageously, the method may result in a polymer resin of high uniformity of angular selective property in the range of about 80% to about 95%.

Further advantageously, the method may result in the formation of a porous polymer resin, which can be fabricated without the use of expensive lithography technique and hence allow scale-up manufacturing and wider applications of the polymer resin.

There is provided use of a polymer composition in the fabrication of polymer film with angular selective properties, wherein said composition comprises at least one (meth)acrylate monomer or oligomer, a phase separating agent, a photoinitiator and a photosensitizer.

In another aspect, the present disclosure refers to use of a polymer composition in the fabrication of a polymer film with angular selective properties, wherein said composition comprises at least one (meth)acrylate monomer or oligomer, a phase separating agent, a photoinitiator and photosensitizer, wherein the weight percent ratio of the sum of said (meth)acrylate monomer(s) or oligomer(s), said phase separating agent, said photoinitiator and said photosensitizer is in the range of 90:4:1:0.1 to 60:30:1:0.1.

There is provided use of a polymer composition in the fabrication of polymer film with porous morphology, wherein said composition comprises at least one (meth)

acrylate monomer or oligomer, a phase separating agent, a photoinitiator and a photosensitizer.

In another aspect, the present disclosure refers to use of a polymer composition in the fabrication of a polymer film with porous morphology, wherein said composition comprises at least one (meth)acrylate monomer or oligomer, a phase separating agent, a photoinitiator and photosensitizer, wherein the weight percent ratio of the sum of said (methy) acrylate monomer(s) or oligomer(s), said phase separating agent, said photoinitiator and said photosensitizer is in the range of 90:4:1:0.1 to 60:30:1:0.1.

Definitions

The following words and terms used herein shall have the meaning indicated:

The term "light-collimating" as used herein refers to directing or controlling light ray propagation direction.

The term "translucent angle" as used herein refers to the angle at which an object appears translucent or blur when seen through the polymer film as described in FIG. 1 translucent angle 100.

The term "view angle" as used herein refers to the angle at which an object appears clear when seen through the polymer film as described in FIG. 1 view angle 300.

The term "micro-louvers" as used herein refers to microscopic structures comprising arrangement of parallel, horizontal slats of material(s) designed to regulate light ray propagation.

The term "phase separating agent" as used herein refers to a non-polar substance which results in the formation of continuous highly uniform pores in the polymer composition during photopolymerization process.

The term "photoinitiator" as used herein refers to a substance capable of generating free radicals on exposure to light and thereby inducing free-radical polymerization.

The term "photosensitizer" as used herein refers to a substance that absorbs light efficiently and enhances the activation of the photoinitiator to produce free radicals.

Unless specified otherwise, the terms "comprising" and "comprise", and grammatical variants thereof, are intended to represent "open" or "inclusive" language such that they include recited elements but also permit inclusion of additional, unrecited elements.

As used herein, the term "about", in the context of concentrations of components of the formulations, typically means +/−5% of the stated value, more typically +/−4% of the stated value, more typically +/−3% of the stated value, more typically, +/−2% of the stated value, even more typically +/−1% of the stated value, and even more typically +/−0.5% of the stated value.

Throughout this disclosure, certain embodiments may be disclosed in a range format. It should be understood that the description in range format is merely for convenience and brevity and should not be construed as an inflexible limitation on the scope of the disclosed ranges. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Certain embodiments may also be described broadly and generically herein. Each of the narrower species and sub-generic groupings falling within the generic disclosure also form part of the disclosure. This includes the generic description of the embodiments with a proviso or negative limitation removing any subject matter from the genus, regardless of whether or not the excised material is specifically recited herein.

DETAILED DISCLOSURE OF EMBODIMENTS

Exemplary, non-limiting embodiments of a polymer composition and a polymer resin will now be disclosed.

The polymer composition may comprise at least one (meth)acrylate monomer or oligomer, a phase separating agent, a photoinitiator and a photosensitizer.

The polymer composition can be regarded as a light-collimating polymer composition and therefore, references to polymer composition can also be treated as referring to the light-collimating polymer composition.

The (meth)acrylate may be both acrylate and methacrylate compounds.

The monomer or oligomer may be any substance that may be converted into a polymer.

The at least one (meth)acrylate monomer or oligomer may form the bulk of an (meth)acrylate resin imparting a stiff or flexible polymer backbone. The at least one (meth)acrylate monomer or oligomer may also be responsible for solidification under UV light irradiation to form porous structural morphology.

The (meth)acrylate monomer or oligomer may be selected from the group consisting of bisphenol A dimethacrylate (Bis-DMA), bisphenol A diglycidyl ether methacrylate (Bis-GMA), ethoxylated bisphenol-A dimethacrylate (Bis-EMA), tricyclo[5.2.1.02,6] decanedimethanol diacrylate, bisphenol A glycerolate diacrylate, bisphenol A ethoxylate diacrylate, bisphenol A ethoxylate dimethacrylate, bisphenol F ethoxylate diacrylate, bis(4-hydroxyphenyl)dimethylmethane diglycidyl ether, isocyanate acrylate, urethane acrylate, branched hexa-functional aliphatic urethane acrylate, bisphenol A diglycidyl ether, bisphenol F diglycidyl ether, ethylene glycol diacrylate, di(ethylene glycol) diacrylate, tetra(ethylene glycol) diacrylate, 1,4-butanediol diacrylate, hydroxy ethylmethacrylate, 3,4-epoxy-cyclohexyl-methyl methacrylate (METHB), triethylene glycol dimethacrylate (TEGDMA), tertiobutyl cyclohexanol methacrylate, 1,6-bis [2-(methacryloyloxy) ethoxycarbonylamino]-2,4,4-trimethylhexane (UDMA), 3,3,5-trimethyl cyclohexanol methacrylate, dipentaerythritol penta-/hexa-acrylate, ethylene glycol diglycidyl ether, 1,4-butanediol diglycidyl ether, resorcinol diglycidyl ether, diglycidyl 1,2-cyclohexanedicarboxylate, propylene glycol diglycidyl ether and neopentyl glycol diglycidyl ether.

The phase separating agent may not be homogeneously polymerized with the bulk (meth)acrylate resin.

The phase separating agent may be a non-polar compound selected from the group consisting of an organic solvent, an organic molecule that will not polymerize with the acrylate resin, an inorganic nanoparticle precursor, a polymer and combinations thereof.

The organic solvent may be selected from the group consisting of an aliphatic hydrocarbon, a cyclic hydrocarbon, an aromatic hydrocarbon, a halogen, a halogenated hydrocarbon, a ketone, an amine, a methoxy compound, an ester, a carboxylate ester, an alcohol, an aldehyde and an ether.

The organic solvent may be selected from the group consisting of isopropyl alcohol, acetonitrile, benzene, 1-butanol, 2-butanol, 2-butanone, t-butyl alcohol, chlorobenzene, toluene, carbon tetrachloride, hexane, pentane, cyclohexane, diethylene glycol, diglyme (diethylene glycol dimethyl ether), 1,2-dimethoxyethane, dioxane, ethylene glycol, glycerin, heptane, hexamethylphosphoramide, xylene and combinations thereof.

The organic molecule may be selected from the group consisting of
- an alcohol having the formula $CH_3(CH_2)_nOH$ or $CH_3(CH=CH)_m(CH_2)_nOH$;
- an amine having the formula $CH_3(CH_2)_nNH_2$ or $CH_3(CH=CH)_m(CH_2)_nNH_2$;
- an acid having the formula $CH_3(CH_2)_nCOOH$ or $CH_3(CH=CH)_m(CH_2)_nCOH$, and combinations thereof, wherein $6<n<22$ and $m=1$ or $2$.

Therefore, the organic molecule may be regarded as a large organic molecule, whereby the alcohol, the amine and acid may be termed as long chained alcohol, long chained amine or long chained acid.

The inorganic nanoparticle precursors may be selected from the group consisting of silane, silicate, metal oxide or alloy, and combinations thereof.

The inorganic nanoparticle precursors may be selected from the group consisting of allyltrimethoxysilane, n-propyltriethoxysilane, tetraethyl orthosilicate, tetrapropyl orthosilicate, titanium(IV) tert-butoxide, titanium(IV) isopropoxide, trimethoxymethylsilane, trimethoxyphenylsilane and combinations thereof.

The polymer may be selected from the group consisting of polyethylene terephthalate (PET), polycarbonate (PC), polyethylene naphthalate (PEN), polybutylene terephthalate (PBT), polymethyl methacrylate (PMMA), polystyrene (PS), polyetherimide (PEI), polyethylene (PE), polypropylene (PP), low-density polyethylene (LDPE), linear low-density polyethylene (LLDPE), ethylene-octene copolymer (EO), ethylene-styrene copolymer (ES), ethylene propylene copolymer (EP), ethylene-hexene copolymer (EH), acrylonitrile butadiene styrene (ABS), tetrafluoroethylene-hexafluoropropylene-vinylidene fluoride copolymer (THV), polyurethane (PU), polyvinyl alcohol (PVA), polyvinyl butyral (PVB), ethylene vinyl acetate (EVA), ethylene-co-acrylate acid (EAA), polyamide (PA), polyvinyl chloride (PVC), polydimethylsiloxane (PDMS), poly p-phenylene sulfide (PPS), polyvinylidene fluoride (PVDF), polyether sulfone (PES), their copolymers and combinations thereof.

The photoinitiator may be selected from the group consisting of UV light initiator and visible light photoinitiator. The choice of photoinitiator used may depend on the light source used for photopolymerization step.

The photoinitiator may selected from the group consisting of bis(2,4,6-trimethyl benzoyl)phenylphosphine oxide (IRGACURE 819), phenylbis(2,4,6-trimethylbenzoyl)phosphine oxide (BAPO), 2,4,6-trimethylbenzoyl diphenyl phosphine (TPO), 2-hydroxy-2-methyl-1-phenyl-1-propane (DAROCUR 1173) and benzophenone (BP).

The photosensitizer may be π electron-rich macrocycles with high molar absorption coefficient. The photosensitizer may be selected from the group consisting of a benzophenone, a quinone, an acrylate, a sebacate, a cinnamate, an isocyanurate, a phosphite, an acridine, a benzophenoxazinium dye, a Δ-aminolevulinic acid, a flavin, a fullerene, a phthalocyanines dye, a phenothiazine dye, a porphyrin and a chlorin. The function of the photosensitizer is to tune curing speed and ensure a good quality of the film. The efficiency of the photosensitizer is related to the light source as it has different light absorption coefficients at different wavelengths.

The photosensitizer may be selected from the group consisting of sudan I-IV, 2,5-bis(5-tert-butyl-benzoxazol-2-yl)thiophene, 4-methoxyphenol, butylated hydroxytoluene, 2-(2H-benzotriazol-2-yl)-6-dodecyl-4-methylphenol, 4-allyloxy-2-hydroxybenzophenone, 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4-methyl-6-(2-propenyl)phenol, 2-[3-(2H-benzotriazol-2-yl)-4-hydroxyphenyl]ethyl methacrylate, 2-(4-benzoyl-3-hydroxyphenoxy)ethyl acrylate, 3,9-bis(2,4-dicumylphenoxy)-2,4,8,10-tetraoxa-3,9-diphosphaspiro[5.5]undecane, bis(1-octyloxy-2,2,6,6-tetramethyl-4-piperidyl) sebacate, bis(2,2,6,6-tetramethyl-4-piperidyl) sebacate, 2-tert-butyl-6-(5-chloro-2H-benzotriazol-2-yl)-4-methylphenol, 2-tert-butyl-4-ethylphenol, 5-chloro-2-hydroxybenzophenone, 5-chloro-2-hydroxy-4-methylbenzophenone, 2,4-di-tert-butyl-6-(5-chloro-2H-benzotriazol-2-yl)phenol, 2,6-di-tert-butyl-4-(dimethylaminomethyl)phenol, 3',5'-dichloro-2'-hydroxyacetophenone, didodecyl 3,3'-thiodipropionate, 2,4-dihydroxybenzophenone, 2,2'-dihydroxy-4-methoxybenzophenone, 2',4'-dihydroxy-3'-propylacetophenone, 2,3-dimethylhydroquinone, 2-(4,6-diphenyl-1,3,5-triazin-2-yl)-5-[(hexyl)oxy]-phenol, 5-ethyl-1-aza-3,7-dioxabicyclo[3.3.0]octane, ethyl 2-cyano-3,3-diphenylacrylate, 2-ethylhexyl 2-cyano-3,3-diphenylacrylate, 2-ethylhexyl trans-4-methoxycinnamate, 2-ethylhexyl salicylate, 2,2'-ethylidene-bis(4,6-di-tert-butylphenol), 2-hydroxy-4-(octyloxy)benzophenone, methyl-p-benzoquinone, 2,2'-methylenebis[6-(2H-benzotriazol-2-yl)-4-(1,1,3,3-tetramethylbutyl)phenol], 2,2'-methylenebis(6-tert-butyl-4-methylphenol), 5,5'-Methylenebis(2-hydroxy-4-methoxybenzophenone), octadecyl 3-(3,5-di-tert-butyl-4-hydroxyphenyl)propionate, 2-phenyl-5-benzimidazolesulfonic acid, poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino], tetrachloro-1,4-benzoquinone, 1,3,5-trimethyl-2,4,6-tris(3,5-di-tert-butyl-4-hydroxybenzyl)benzene, tris(4-tert-butyl-3-hydroxy-2,6-dimethylbenzyl) isocyanurate, Tris(2,4-di-tert-butylphenyl) phosphite, 1,3,5-tris(2-hydroxyethyl)isocyanurate, tris(nonylphenyl) phosphite and combinations thereof.

The polymer composition may further comprise a component selected from the group consisting of an additive, a rheology modifier and combinations thereof.

The additive may be selected from the group consisting of a plasticizer, a polymer property modifier, a nano-filler and combinations thereof.

The plasticizer and polymer properties modifier may be used to adjust the glass transition temperature, melt viscosity and elastic modulus of the resultant polymer resin.

The plasticizer and polymers properties modifier may be selected from the group consisting of 4,4'-(oxydi-2,1-ethanediyl)bismorpholine; tert-dodecyl polysulfide average, polyester-block-polyether α, ω-diol, dodecylbenzenesulfonic acid, dinonylnaphthalenedisulfonic acid, benzyl butyl phthalate, bis[2-(2-butoxyethoxy)ethyl]adipate, bis(2-ethylhexyl) adipate, bis(2-ethylhexyl) adipate, bis(2-ethylhexyl) maleate, bis(2-ethylhexyl) sebacate, bis(2-ethylhexyl) sebacate, DBE-3, DBE-5, DBE-5 dibasic ester, DBE-9, DBE dibasic ester, dibutyl adipate, dibutyl itaconate, dibutyl sebacate, dicyclohexyl phthalate, diethyl adipate, dicyclohexyl phthalate, diethyl adipate, diethyl azelate, di(ethylene glycol) dibenzoate, diethyl sebacate, diethyl succinate, diethyl succinate, diheptyl phthalate, diisobutyl adipate, diisobutyl fumarate, diisobutyl phthalate, diisodecyl adipate, diisononyl phthalate ester, dimethyl adipate, dimethyl adipate, dimethyl azelate, dimethyl phthalate, dimethyl sebacate, dioctyl terephthalate, diphenyl phthalate, dimethyl sebacate, dioctyl terephthalate, diphenyl phthalate, di(propylene glycol) dibenzoate, dipropyl phthalate, ethyl 4-acetylbutyrate, isooctyl tallate, neopentyl glycol dimethylsulfate, 2-nitrophenyl octyl ether, poly(ethylene glycol) bis(2-ethylhexanoate), poly(ethylene glycol) dibenzoate, poly(ethylene glycol) dioleate, poly(ethylene glycol) monolaurate, sucrose benzoate, trioctyl trimellitate and combinations thereof.

The nano-filler may have undergone surface modification.

The nano-filler may be used for thermal stability and mechanical strength enhancement.

The nano-filler may be selected from the group consisting of polyhedral oligosilsesquioxane (POSS) and its derivatives, various nano-oxide such as ZnO, $TiO_2$, $SiO_2$, $ZrO_2$, $BaTiO_3$, $CeO_2$, $VO_2$, $V_2O_3$, boehmite, $Al_2O_3$, and combinations thereof.

When the nano-filler is nano-oxide, the nano-oxide may have a particles size in the range of about 0.5 nm to about 100.0 nm, about 5.0 nm to about 100 nm, about 10.0 nm to about 100 nm, about 20.0 nm to about 100 nm, about 40.0 nm to about 100 nm, about 60.0 nm to about 100 nm, about 80.0 nm to about 100 nm, about 0.5 nm to about 5.0 nm, about 0.5 nm to about 10.0 nm, about 0.5 nm to about 20.0 nm, about 0.5 nm to about 40.0 nm, about 0.5 nm to about 60.0 nm, about 0.5 nm to about 80.0 nm, about 5.0 nm to about 10.0 nm, about 5.0 nm to about 20.0 nm, about 5.0 nm to about 40.0 nm, about 5.0 nm to about 60.0 nm, about 5.0 nm to about 80.0 nm, about 10.0 nm to about 20.0 nm, about 10.0 nm to about 40.0 nm, about 10.0 nm to about 60.0 nm, about 10.0 nm to about 80.0 nm, about 20.0 nm to about 40.0 nm, about 20.0 nm to about 60.0 nm, about 20.0 nm to about 80.0 nm, about 40.0 nm to about 60.0 nm, about 40.0 nm to about 80.0 nm, or about 60.0 nm to about 80.0 nm.

The rheology modifier may be an agent that is able to polymerize with the bulk (meth)acrylate resin or with or without covalent linkage with the polymer matrix.

The rheology modifier that may be covalently linked with the polymer matrix may be selected from the group consisting of small acrylate or epoxy molecule, particularly hyper-branched small acrylate or epoxy molecule, and combinations thereof.

The rheology modifier may be selected from the group consisting of tetrahydrofurfuryl methacrylate, 2-carboxyethyl acrylate, trimethylolpropane triacrylate, pentaerythritol triacrylate, di(trimethylolpropane) tetraacrylate, pentaerythritol tetraacrylate, 2-[[(butylamino)carbonyl]oxy]ethyl acrylate, vinyl T-structure polymers, methacryloxypropyl T-structure siloxanes, ethacryl POSS cage mixture, methacrylethyl POSS, trimethylolpropane triglycidyl ether, tris(4-hydroxyphenyl)methane triglycidyl ether, monophenyl functional tris(epoxy terminated polydimethylsiloxane), epoxycyclohexyl POSS cage mixture, triglycidylisobutyl POSS, glycidyl POSS cage, PEG POSS cage, trifluoropropyl POSS cage, octamethyl POSS, octaphenyl POSS, and oxide nanoparticles such as $SiO_2$, $TiO_2$, ZnO and combinations thereof.

When the rheology modifier is an oxide nanoparticle, the oxide nanoparticle may be of a particle size in the range of about 20 nm to about 200 nm, about 50 nm to about 200 nm, about 80 nm to about 200 nm, about 100 nm to about 200 nm, about 150 nm to about 200 nm, about 180 nm to about 200 nm, about 20 nm to about 50 nm, about 20 nm to about 80 nm, about 20 nm to about 100 nm, about 20 nm to about 150 nm, about 20 nm to about 180 nm, about 50 nm to about 80 nm, about 50 nm to about 100 nm, about 50 nm to about 150 nm, about 50 nm to about 180 nm, about 80 nm to about 100 nm, about 80 nm to about 150 nm, about 80 nm to about 180 nm, about 100 nm to about 150 nm, about 100 nm to about 180 nm, or about 150 nm to about 180 nm.

The polymer composition may comprise
from about 60.0% to about 95.0% by weight of the (meth)acrylate monomer(s) or oligomer(s);
from about 1.0% to about 30.0% by weight of the phase separating agent;
from about 0.1% to about 5.0% by weight of the photoinitiator;
from about 0.0% to about 20.0% by weight of the additive;
from about 0.0% to about 10.0% by weight of the rheology modifier; and
from about 0.0% to about 2.0% by weight of the photosensitizer.

Therefore, the polymer composition may have a (meth)acrylate monomer(s) or oligomer(s) content of about 60.0% to about 95.0% by weight, about 70.0% to about 95.0% by weight, about 80.0% to about 95.0% by weight, about 90.0% to about 95.0% by weight, about 60.0% to about 70.0% by weight, about 60.0% to about 80.0% by weight, about 60.0% to about 90.0% by weight, about 70.0% to about 80.0% by weight, about 70.0% to about 90.0% by weight, or about 80.0% to about 90.0% by weight.

The polymer composition may have a phase separating agent content of about 1.0% to about 30.0% by weight, about 5.0% to about 30.0% by weight, about 10.0% to about 30.0% by weight, about 20.0% to about 30.0% by weight, about 25.0% to about 30.0% by weight, about 1.0% to about 5.0% by weight, about 1.0% to about 10.0% by weight, about 1.0% to about 20.0% by weight, about 1.0% to about 25.0% by weight, about 5.0% to about 10.0% by weight, about 5.0% to about 20.0% by weight, about 5.0% to about 25.0% by weight, about 10.0% to about 20.0% by weight, about 10.0% to about 25.0% by weight, or about 20.0% to about 25.0% by weight. The polymer composition may have a phase separating agent content at a particularly preferred range of 5% to 15% by weight.

The polymer composition may have a photoinitiator content of about 0.1% to about 5.0% by weight, about 0.5% to about 5.0% by weight, about 1.0% to about 5.0% by weight, about 2.0% to about 5.0% by weight, about 4.0% to about 5.0% by weight, about 0.5% to about 1.0% by weight, about 0.5% to about 2.0% by weight, about 0.5% to about 4.0% by weight, about 1.0% to about 2.0% by weight, about 1.0% to about 4.0% by weight, or about 2.0% to about 4.0% by weight.

The polymer composition may have an additive content of about 0.0% to about 20.0% by weight, about 0.0% to about 20.0% by weight, about 5.0% to about 20.0% by weight, about 8.0% to about 20.0% by weight, about 10.0% to about 20.0% by weight, about 15.0% to about 20.0% by weight, about 18.0% to about 20.0% by weight, about 0.0% to about 5.0% by weight, about 0.0% to about 8.0% by weight, about 0.0% to about 10.0% by weight, about 0.0% to about 15.0% by weight, about 0.0% to about 18.0% by weight, about 5.0% to about 8.0% by weight, about 5.0% to about 10.0% by weight, about 5.0% to about 15.0% by weight, about 5.0% to about 18.0% by weight, about 8.0% to about 10.0% by weight, about 8.0% to about 15.0% by weight, about 8.0% to about 18.0% by weight, about 10.0% to about 15.0% by weight, about 10.0% to about 18.0% by weight, or about 15.0% to about 18.0% by weight.

The polymer composition may have a rheology modifier content of about 0.0% to about 10.0% by weight, about 2.0% to about 10.0% by weight, about 4.0% to about 10.0% by weight, about 6.0% to about 10.0% by weight, about 8.0% to about 10.0% by weight, about 0.0% to about 2.0% by weight, about 0.0% to about 4.0% by weight, about 0.0% to about 6.0% by weight, about 0.0% to about 8.0% by weight, about 2.0% to about 4.0% by weight, about 2.0% to about 6.0% by weight, about 2.0% to about 8.0% by weight, about 4.0% to about 6.0% by weight, about 4.0% to about 8.0% by weight, or about 6.0% to about 8.0% by weight.

The polymer composition may have a photosensitizer content of about 0.0% to about 2.0% by weight, about 0.2% to about 2.0% by weight, about 0.5% to about 2.0% by weight, about 1.0% to about 2.0% by weight, about 1.2% to about 2.0% by weight, about 1.5% to about 2.0% by weight, about 0.0% to about 0.2% by weight, about 0.0% to about 0.5% by weight, about 0.0% to about 1.0% by weight, about 0.0% to about 1.5% by weight, about 0.2% to about 0.5% by weight, about 0.2% to about 1.0% by weight, about 0.2% to about 1.5% by weight, about 0.5% to about 1.0% by weight, about 0.5% to about 1.5% by weight, or about 1.0% to about 1.5% by weight.

The concentration of the photoinitiator may preferentially be in the range of about 0.5 weight % to about 3.0 weight %, about 1.0 weight % to about 3.0 weight %, about 1.5 weight % to about 3.0 weight %, about 2.0 weight % to about 3.0 weight %, about 2.5 weight % to about 3.0 weight %, about 0.5 weight % to about 1.0 weight %, about 0.5 weight % to about 1.5 weight %, about 0.5 weight % to about 2.0 weight %, about 0.5 weight % to about 2.5 weight %, about 1.0 weight % to about 1.5 weight %, about 1.0 weight % to about 2.0 weight %, about 1.0 weight % to about 2.5 weight %, about 1.5 weight % to about 2.0 weight %, about 1.5 weight % to about 2.5 weight %, or about 2.0 weight % to about 2.5 weight % of the light-collimating polymer composition.

The weight percent ratio of the sum of the (meth)acrylate monomer(s) or oligomer(s), the phase separating agent, the photoinitiator and the photosensitizer may be in the range of 90:4:1:0.1 to 60:30:1:0.1.

When the polymer composition is polymerized, a polymer resin is formed. The polymer resin may have a porous morphology with an average pore diameter in the range of 1 µm to 20 µm.

The polymer resin may have a translucent angle tunable freely in the range of 5° to 175°. The corresponding view angle may be in the range of 0° to 180°.

When the polymer resin has a translucent angle in the range of 5° to 40°, the corresponding view angle may be in the range of 120° to 175°.

The polymer resin may be transparent, semi-transparent or opaque.

Exemplary, non-limiting embodiments of a method of preparing a polymer resin will now be disclosed.

The method of preparing a polymer resin may comprise the step of polymerizing a solution of at least one (meth) acrylate polymer or oligomer, a photoinitiator, a photosensitizer and a phase separating agent in the presence of UV light to form the polymer resin.

The method may further comprise a mixing step, before said step of polymerizing a solution, wherein at least one solid (meth)acrylate polymer or oligomer, is completely mixed with said photoinitiator, said photosensitizer and said phase separating agent in the absence of light, under conditions to form said solution.

The sequence of addition of the components to prepare the polymerization solution by mixing may not affect the performance of the polymer resin.

The conditions in the mixing step may include agitation at room temperature in the absence of light for about 4 to about 24 hours, particularly for about 4 to about 8 hours, until all the solid contents are completely dissolved.

The mixing and polymerizing steps may further comprise a component selected from the group consisting of an additive, a rheology modifier and combinations thereof.

The mixing step may further comprise ultrasonicating at a frequency of at least 20 kHz for 15 minutes, or at appropriate conditions that will allow for the mixing to be complete.

In said polymerizing step, said UV light may be generated from a UV LED array panel light source or a UV tubular light source.

When said UV LED panel light source is used, the uniformity of the angular selectivity of said polymer resin may be in the range of 80% to 95%.

When said UV tubular light source is used, the uniformity of the angular selectivity of said polymer resin may be in the range of 75% to 85%.

Exemplary, non-limiting embodiments of uses of a polymer composition will now be disclosed.

There is provided use of a polymer composition in the fabrication of polymer film with angular selective properties, wherein said composition comprises at least one (meth) acrylate monomer or oligomer, a phase separating agent, a photoinitiator and a photosensitizer.

There is also provided use of a polymer composition in the fabrication of polymer film with porous morphology, wherein said composition comprises at least one (meth) acrylate monomer or oligomer, a phase separating agent, a photoinitiator and a photosensitizer.

BRIEF DESCRIPTION OF DRAWINGS

The accompanying drawings illustrate a disclosed embodiment and serves to explain the principles of the disclosed embodiment. It is to be understood, however, that the drawings are designed for purposes of illustration only, and not as a definition of the limits of the invention.

FIG. 1 is a schematic diagram depicting the transmission of incident light on the front of a surface 400, wherein the translucent angle 100 is not visible for a particular translucent angle range 200, with a corresponding view angle 300 which is visible from the front.

FIG. 2 is a scanning-electron microscopy (SEM) image of a polymer resin (magnification of ×350 and scale bar of 10 µm) made in accordance to the preparation process in Example 1. The SEM image shows the surface morphology of the polymer resin resembling micro-louvers.

FIG. 3 is a SEM image of a polymer resin (magnification of ×200 and scale bar of 100 µm) made in accordance to the preparation process in Example 2. The SEM image shows the surface morphology of the polymer resin resembling micro-louvers.

FIG. 4 is a SEM image of a polymer resin (magnification of ×110 and scale bar of 100 µm) made in accordance to the preparation process in Example 3. The SEM image shows the surface morphology of the polymer resin resembling micro-louvers.

FIG. 5 is a SEM image of a polymer resin (magnification of ×180 and scale bar of 100 µm) made in accordance to the preparation process in Example 4. The SEM image shows the surface morphology of the polymer resin resembling micro-louvers.

EXAMPLES

Non-limiting examples of the invention will be further described in greater detail by reference to specific Examples, which should not be construed as in any way limiting the scope of the invention.

Materials and Methods

All the reagents were obtained from commercial suppliers and used without further purification. Commercially available di(ethylene glycol) diacrylate, tetrahydrofurfuryl methacrylate, tert-butyl acrylate, phenylbis(2,4,6-trimethylbenzoyl)phosphine oxide, isopropyl alcohol, 2,5-bis(5-tert-butyl-benzoxazol-2-yl)thiophene, diphenyl phthalate, 1,6-hexanediol diacrylate, bisphenol A diglycidyl ether methacrylate, methyl methacrylate, phenylbis(2,4,6-trimethylbenzoyl)phosphine oxide, glycerin, poly(ethylene glycol) diacrylate, 3-(trimethoxysilyl)propyl methacrylate were purchased from Sigma-Aldrich (of St. Louis, Missouri of the United States of America). Methacryl polyhedral oligomeric silsesquioxane was purchased from Hybrid Plastics (United States of America).

The morphology, crystallinity and surface characterization were performed using Zeiss Supra 40 VP scanning electron microscope (SEM) and Bruker 2D diffractometer equipped with Cu K_$\alpha$ radiation ($\lambda$=1.5418 Å) at a 2$\theta$ range of 2.5-97.2°. Sonication was conducted to enhance mixing to obtain a polymerizing solution using a sonication bath (VWR, Singapore). To induce photopolymerization, two types of UV light sources were used, namely UV LED array panel (TaoBao, China) and UV tubular lamps (Jia Shide, China) with power of 8 W UVA.

Example 1: Preparation of a Polymer Resin of Polymer Composition 1

A polymer composition 1 was prepared using the following chemical components in the indicated amounts in Table 1.

TABLE 1

Concentration of components of polymer composition 1

| Chemicals | Concentrations (weight %) |
|---|---|
| Di(ethylene glycol) diacrylate | 60 |
| Tetrahydrofurfuryl methacrylate | 5 |
| Tert-butyl acrylate | 15 |
| Phenylbis(2,4,6-trimethylbenzoyl)phosphine oxide | 0.5 |
| Methacryl polyhedral oligomeric silsesquixone | 0.2 |
| Isopropyl alcohol | 15 |
| 2,5-Bis(5-tert-butyl-benzoxazol-2-yl)thiophene | 0.05 |
| Diphenyl phthalate | 4.25 |

To prepare the polymer composition 1, di(ethylene glycol) diacrylate (120 g), tetrahydrofurfuryl methacrylate (10 g), tert-butyl acrylate (30 g), phenylbis(2,4,6-trimethylbenzoyl)phosphine oxide (1 g), methacryl polyhedral oligomeric silsesquioxane (0.4 g), isopropyl alcohol (30 g), 2,5-bis(5-tert-butyl-benzoxazol-2-yl)thiophene (0.1 g) and diphenyl phthalate (8.5 g), were weighted into a flask in sequence and stirred in at room temperature, in the absence of light for 4 to 24 hours until all the solid contents were completely dissolved. Ultrasonication at a frequency of at least 20 kHz for duration of 15 minutes was used to dissolve the solid contents thoroughly. Photopolymerization of the resultant mixture was conducted using a UV tubular lamp with a power rating of an 8 W UVA, at a distance of 11 cm for 10 minutes.

The morphology of the synthesized polymer resin comprising polymer composition 1 was characterized by scanning electron microscopy as depicted in FIG. 2. Based on FIG. 2, synthesized polymer resin shows cavities on the surface of the polymer resin resembling micro-louvers.

Example 2: Preparation of a Polymer Resin of Polymer Composition 2

A polymer composition 2 was prepared using the following chemical components in the indicated amounts in Table 2.

TABLE 2

Concentration of components of polymer composition 2

| Chemicals | Concentrations (weight %) |
|---|---|
| 1,6-Hexanediol diacrylate | 60 |
| Bisphenol A diglycidyl ether methacrylate | 10 |
| Methyl methacrylate | 10 |
| Phenylbis(2,4,6-trimethylbenzoyl)phosphine oxide | 0.5 |
| Methacryl polyhedral oligomeric silsesquoxone | 0.2 |
| Glyerin | 15 |
| 2,5-B is (5-tert-butyl-benzoxazol-2- yl)thiophene | 0.05 |
| Diheptyl phthalate | 4.25 |

To prepare the polymer composition 2, 1,6-hexanediol diacrylate (120 g), bisphenol A diglycidyl ether methacrylate (20 g), methyl methacrylate (20 g), phenylbis(2,4,6-trimethylbenzoyl)phosphine oxide (1 g), methacryl polyhedral oligomeric silsesquioxane (0.4 g), glycerin (30 g), 2,5-bis(5-tert-butyl-benzoxazol-2-yl)thiophene (0.1 g) and diheptyl phthalate (8.5 g), were weighted into a flask in sequence and stirred in at room temperature, in the absence of light for 4 to 24 hours until all the solid contents were completely dissolved. Ultrasonication at a frequency of at least 20 kHz for duration of 15 minutes was used to dissolve the solid contents thoroughly. Photopolymerization of the resultant mixture was conducted using a UV LED light array panel with a power rating of 20 W UVA, at distance of 11 cm for 5 minutes.

The morphology of the synthesized polymer resin comprising polymer composition 2 was characterized by scanning electron microscopy as depicted in FIG. 3. Based on FIG. 3, synthesized polymer resin shows cavities on the surface of the polymer resin resembling micro-louvers.

Example 3: Preparation of a Polymer Resin of Polymer Composition 3

A polymer composition 3 was prepared using the following chemical components in the indicated amounts in Table 3.

TABLE 3

Concentration of components of polymer composition 3

| Chemicals | Concentrations (weight %) |
|---|---|
| Poly(ethylene glycol) diacrylate | 60 |
| 3-(Trimethoxysilyl)propyl methacrylate | 15 |
| Tert-butyl acrylate | 10 |

TABLE 3-continued

Concentration of components of polymer composition 3

| Chemicals | Concentrations (weight %) |
|---|---|
| Phenylbis(2,4,6-trimethylbenzoyl)phosphine oxide | 0.5 |
| Methacryl polyhedral oligomeric silsesquioxone | 0.2 |
| Tetraethyl orthosilicate | 10 |
| 2,5-Bis(5-tert-butyl-benzoxazol-2-yl)thiophene | 0.05 |
| Diheptyl phthalate | 4.25 |

To prepare the polymer composition 3, poly(ethylene glycol) diacrylate (120 g), 3-(trimethoxysilyl)propyl methacrylate (30 g), tert-butyl acrylate (20 g), phenylbis(2,4,6-trimethylbenzoyl)phosphine oxide (1 g), methacryl polyhedral oligomeric silsesquioxane (0.4 g), tetraethyl orthosilicate (20 g), 2,5-bis(5-tert-butyl-benzoxazol-2-yl)thiophene (0.1 g) and diheptyl phthalate (8.5 g), were weighted into a flask in sequence and stirred in at room temperature, in the absence of light for 4 to 24 hours until all the solid contents were completely dissolved. Ultrasonication at a frequency of at least 20 kHz for duration of 15 minutes was used to dissolve the solid contents thoroughly. Photopolymerization of the resultant mixture was conducted using a UV tubular lamp with a power rating of an 8 W UVA, at a distance of 11 cm for 10 minutes.

The morphology of the synthesized polymer resin comprising polymer composition 3 was characterized by scanning electron microscopy as depicted FIG. 4. Based on FIG. 4, synthesized polymer resin shows cavities on the surface of the polymer resin resembling micro-louvers.

Example 4: Preparation of a Polymer Resin of Polymer Composition 4

A polymer composition 4 was prepared using the following chemical components in the indicated amounts in Table 4.

TABLE 4

Concentration of components of polymer composition 4

| Chemicals | Concentrations (weight %) |
|---|---|
| Poly(ethylene glycol) diacrylate | 80 |
| Pentaerythritol triacrylate | 3.2 |
| Tert-butyl acrylate | 10 |
| Phenylbis(2,4,6-trimethylbenzoyl)phosphine oxide | 0.5 |
| Methacryl polyhedral oligomeric silsesquioxone | 0.2 |
| Polystyrene | 1.5 |
| 2,5-Bis(5-tert-butyl-benzoxazol-2-yl)thiophene | 0.05 |
| Diheptyl phthalate | 4.25 |

To prepare the polymer composition 4, poly(ethylene glycol) diacrylate (160 g), pentaerythritol triacrylate (6.4 g), tert-butyl acrylate (20 g), phenylbis(2,4,6-trimethylbenzoyl) phosphine oxide (1 g), methacryl polyhedral oligomeric silsesquioxane (0.4 g), polystyrene (3 g), 2,5-bis(5-tert-butyl-benzoxazol-2-yl)thiophene (0.1 g) and diheptyl phthalate (8.5 g), were weighted into a flask in sequence and stirred in at room temperature, in the absence of light for 4 to 24 hours until all the solid contents were completely dissolved. Ultrasonication at a frequency of at least 20 kHz for duration of 15 minutes was used to dissolve the solid contents thoroughly. Photopolymerization of the resultant mixture was conducted using a UV tubular lamp with a power rating of an 8 W UVA, at a distance of 11 cm for 10 minutes.

The morphology of the synthesized polymer resin comprising light-collimating polymer composition 4 was characterized by scanning electron microscopy as depicted in FIG. 5. Based on FIG. 5, synthesized polymer resin shows cavities on the surface of the polymer resin resembling micro-louvers.

INDUSTRIAL APPLICABILITY

The polymer composition may be used in a wide variety of applications such as in privacy screens, lenses of safety goggles, smart windows, buildings, detectors, coatings, 3D printing and solar energy applications.

The method used to prepare the polymer composition may allow for large-scale manufacturing and broadening of applications for the polymer resin comprising the polymer composition.

It will be apparent that various other modifications and adaptations of the invention will be apparent to the person skilled in the art after reading the foregoing disclosure without departing from the spirit and scope of the invention and it is intended that all such modifications and adaptations come within the scope of the appended claims.

The invention claimed is:

1. A polymer composition comprising:
   at least one (meth)acrylate monomer or oligomer;
   a phase separating agent;
   a photoinitiator; and
   a photosensitizer,
   wherein said photosensitizer is selected from the group consisting of a benzophenone, a quinone, an acrylate, a sebacate, a cinnamate, an isocyanurate, a phosphite, an acridine, a benzophenoxazinium dye, a Δ-aminolevulinic acid, a flavin, a fullerene, a phthalocyanines dye, a phenothiazine dye, a porphyrin, and a chlorin, and
   wherein said (meth)acrylate monomer or oligomer is selected from the group consisting of bisphenol A dimethacrylate (Bis-DMA), bisphenol A diglycidyl ether methacrylate (Bis-GMA), ethoxylated bisphenol-A dimethacrylate (Bis-EMA), tricyclo[5.2.1.02,6] decanedimethanol diacrylate, bisphenol A glycerolate diacrylate, bisphenol A ethoxylate diacrylate, bisphenol A ethoxylate dimethacrylate, bisphenol F ethoxylate diacrylate, isocyanate acrylate, urethane acrylate, branched hexa-functional aliphatic urethane acrylate, ethylene glycol diacrylate, di(ethylene glycol) diacrylate, tetra(ethylene glycol) diacrylate, 1,4-butanediol diacrylate, hydroxy ethylmethacrylate, 3,4-epoxy-cyclohexyl-methyl methacrylate (METHB), triethylene glycol dimethacrylate (TEGDMA), tertiobutyl cyclohexanol methacrylate, 1,6-bis[2-(methacryloyloxy) ethoxycarbonylamino]-2,4,4-trimethylhexane (UDMA), 3,3,5-trimethyl cyclohexanol methacrylate, and dipentaerythritol penta-/hexa-acrylate.

2. The polymer composition of claim 1, wherein said phase separating agent is selected from the group consisting of an organic solvent, an organic molecule that will not polymerize with the acrylate resin, an inorganic nanoparticle precursor, a polymer and combinations thereof;
   wherein said organic solvent is selected from the group consisting of an aliphatic hydrocarbon, a cyclic hydrocarbon, an aromatic hydrocarbon, a halogen, a halogenated hydrocarbon, a ketone, an amine, a methoxy compound, an ester, a carboxylate ester, an alcohol, an aldehyde and an ether; or
   wherein said organic molecule is selected from the group consisting of an alcohol having the formula $CH_3(CH_2)_nOH$ or $CH_3(CH=CH)_m(CH_2)_nOH$;

an amine having the formula $CH_3(CH_2)_nNH_2$ or $CH_3(CH=CH)_m(CH_2)_nNH_2$;

an acid having the formula $CH_3(CH_2)_nCOOH$ or $CH_3(CH=CH)_m(CH_2)_nCOH$, and combinations thereof, wherein 6<n<22 and m=1 or 2; or wherein said inorganic nanoparticle precursor is selected from the group consisting of silane, silicate, a metal oxide or alloy, and combinations thereof, or wherein said polymer is selected from the group consisting of polyethylene terephthalate (PET), polycarbonate (PC), polyethylene naphthalate (PEN), polybutylene terephthalate (PBT), polymethyl methacrylate (PMMA), polystyrene (PS), polyetherimide (PEI), polyethylene (PE), polypropylene (PP), low-density polyethylene (LDPE), linear low-density polyethylene (LLDPE), ethylene-octene copolymer (EO), ethylene-styrene copolymer (ES), ethylene propylene copolymer (EP), ethylene-hexene copolymer (EH), acrylonitrile butadiene styrene (ABS), tetrafluoroethylene-hexafluoropropylene-vinylidene fluoride copolymer (THV), polyurethane (PU), polyvinyl alcohol (PVA), polyvinyl butyral (PVB), ethylene vinyl acetate (EVA), ethylene-co-acrylate acid (EAA), polyamide (PA), polyvinyl chloride (PVC), polydimethylsiloxane (PDMS), poly p-phenylene sulfide (PPS), polyvinylidene fluoride (PVDF), polyether sulfone (PES), copolymers thereof and combinations thereof.

3. The polymer composition of claim 1, wherein said photoinitiator is a UV light photoinitiator or a visible light photoinitiator, or wherein said photoinitiator is selected from the group consisting of bis(2,4,6-trimethyl benzoyl)phenylphosphine oxide, 2,4,6-trimethylbenzoyl diphenyl phosphine oxide (TPO), 2-hydroxy-2-methyl-1-phenyl-1-propane (DAROCUR 1173) and benzophenone (BP).

4. The polymer composition of claim 1, wherein said photosensitizer is selected from the group consisting of sudan I-IV, 2,5-bis(5-tert-butyl-benzoxazol-2-yl)thiophene, 4-methoxyphenol, butylated hydroxytoluene, 2-(2H-benzotriazol-2-yl)-6-dodecyl-4-methylphenol, 4-allyloxy-2-hydroxybenzophenone, 2-(2H-benzotriazol-2-yl)-4,6-di-tert-pentylphenol, 2-(2H-benzotriazol-2-yl)-6-dodecyl-4-methylphenol, 2-(2H-benzotriazol-2-yl)-4-methyl-6-(2-propenyl)phenol, 2-[3-(2H-benzotriazol-2-yl)-4-hydroxyphenyl]ethyl methacrylate, 2-(4-benzoyl-3-hydroxyphenoxy)ethyl acrylate, 3,9-bis(2,4-dicumylphenoxy)-2,4,8,10-tetraoxa-3,9-diphosphaspiro [5.5]undecane, bis(1-octyloxy-2,2,6,6-tetramethyl-4-piperidyl) sebacate, bis(2,2,6,6-tetramethyl-4-piperidyl) sebacate, 2-tert-butyl-6-(5-chloro-2H-benzotriazol-2-yl)-4-methylphenol, 2-tert-butyl-4-ethylphenol, 5-chloro-2-hydroxybenzophenone, 5-chloro-2-hydroxy-4-methylbenzophenone, 2,4-di-tert-butyl-6-(5-chloro-2H-benzotriazol-2-yl)phenol, 2,6-di-tert-butyl-4-(dimethylaminomethyl) phenol, 3',5'-dichloro-2'-hydroxyacetophenone, didodecyl 3,3'-thiodipropionate, 2,4-dihydroxybenzophenone, 2,2'-dihydroxy-4-methoxybenzophenone, 2',4'-dihydroxy-3'-propylacetophenone, 2,3-dimethylhydroquinone, 2-(4,6-diphenyl-1,3,5-triazin-2-yl)-5-[(hexyl)oxy]-phenol, 5-ethyl-1-aza-3,7-dioxabicyclo[3.3.0]octane, ethyl 2-cyano-3,3-diphenylacrylate, 2-ethylhexyl 2-cyano-3,3-diphenylacrylate, 2-ethylhexyl trans-4-methoxycinnamate, 2-ethylhexyl salicylate, 2,2'-ethylidene-bis(4,6-di-tert-butylphenol), 2-hydroxy-4-(octyloxy)benzophenone, methyl-p-benzoquinone, 2,2'-methylenebis[6-(2H-benzotriazol-2-yl)-4-(1,1,3,3-tetramethylbutyl)phenol], 2,2'-methylenebis(6-tert-butyl-4-methylphenol), 5,5'-Methylenebis(2-hydroxy-4-methoxybenzophenone), octadecyl 3-(3,5-di-tert-butyl-4-hydroxyphenyl)propionate, 2-phenyl-5-benzimidazolesulfonic acid, poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino], tetrachloro-1,4-benzoquinone, 1,3,5-trimethyl-2,4,6-tris(3,5-di-tert-butyl-4-hydroxybenzyl)benzene, tris(4-tert-butyl-3-hydroxy-2,6-dimethylbenzyl) isocyanurate, Tris(2,4-di-tert-butylphenyl) phosphite, 1,3,5-tris(2-hydroxyethyl)isocyanurate, tris(nonylphenyl) phosphite, and combinations thereof.

5. The polymer composition of claim 1, further comprising a component selected from the group consisting of an additive, a rheology modifier, and combinations thereof.

6. The polymer composition of claim 1, comprising:
from 60.0% to 95.0% by weight of said (meth)acrylate monomer(s) or oligomer(s);
from 1.0% to 30.0% by weight of said phase separating agent;
from 0.1% to 5.0% by weight of said photoinitiator;
from 0.0% to 20.0% by weight of said additive;
from 0.0% to 10.0% by weight of said rheology modifier; and
from 0.2% to 2.0% by weight of said photosensitizer.

7. A polymer resin comprising a polymerized polymer composition, wherein the polymer composition comprises at least one (meth)acrylate monomer or oligomer, a phase separating agent, a photoinitiator, and a photosensitizer,
wherein the polymer resin has a translucent angle tunable freely in the range of 5° to 175°, wherein said translucent angle refers to the angle which an object appears translucent or blur when seen through said polymer resin,
wherein said photosensitizer is selected from the group consisting of a benzophenone, a quinone, an acrylate, a sebacate, a cinnamate, an isocyanurate, a phosphite, an acridine, a benzophenoxazinium dye, a Δ-aminolevulinic acid, a flavin, a fullerene, a phthalocyanines dye, a phenothiazine dye, a porphyrin, and a chlorin, and
wherein said (meth)acrylate monomer or oligomer is selected from the group consisting of bisphenol A dimethacrylate (Bis-DMA), bisphenol A diglycidyl ether methacrylate (Bis-GMA), ethoxylated bisphenol-A dimethacrylate (Bis-EMA), tricyclo[5.2.1.02,6] decanedimethanol diacrylate, bisphenol A glycerolate diacrylate, bisphenol A ethoxylate diacrylate, bisphenol A ethoxylate dimethacrylate, bisphenol F ethoxylate diacrylate, isocyanate acrylate, urethane acrylate, branched hexa-functional aliphatic urethane acrylate, ethylene glycol diacrylate, di(ethylene glycol) diacrylate, tetra(ethylene glycol) diacrylate, 1,4-butanediol diacrylate, hydroxy ethylmethacrylate, 3,4-epoxy-cyclohexyl-methyl methacrylate (METHB), triethylene glycol dimethacrylate (TEGDMA), tertiobutyl cyclohexanol methacrylate, 1,6-bis[2-(methacryloyloxy) ethoxycarbonylamino]-2,4,4-trimethylhexane
(UDMA), 3,3,5-trimethyl cyclohexanol methacrylate, and dipentaerythritol penta-/hexa-acrylate.

8. The polymer resin of claim 7, wherein the polymer resin has a porous morphology with an average pore diameter in the range of 1 μm to 20 μm.

9. The polymer resin of claim 7, wherein the polymer resin has a corresponding view angle in the range of 0° to 180°, wherein said view angle refers to the angle at which an object appears clear when seen through said polymer resin.

10. The polymer resin of claim 7, wherein the polymer resin has a translucent angle in the range of 5° to 40°, and a corresponding view angle in the range of 120° to 175°.

11. The polymer resin of claim 7, wherein the polymer resin is transparent, semi-transparent or opaque.

12. A method of preparing a polymer resin comprising:
a step of mixing at least one (meth)acrylate monomer or oligomer, a photoinitiator, a photosensitizer, and a phase separating agent in the absence of light to form a solution; and
a step of polymerizing the solution in the presence of UV light to form the polymer resin,
wherein said photosensitizer is selected from the group consisting of a benzophenone, a Quinone, an acrylate, a sebacate, a cinnamate, an isocyanurate, a phosphite, an acridine, a benzophenoxazinium dye, a Δ-aminolevulinic acid, a flavin, a fullerene, a phthalocyanines dye, a phenothiazine dye, a porphyrin, and a chlorin, and
wherein said (meth)acrylate monomer or oligomer is selected from the group consisting of bisphenol A dimethacrylate (Bis-DMA), bisphenol A diglycidyl ether methacrylate (Bis-GMA), ethoxylated bisphenol-A dimethacrylate (Bis-EMA), tricyclo[5.2.1.02,6] decanedimethanol diacrylate, bisphenol A glycerolate diacrylate, bisphenol A ethoxylate diacrylate, bisphenol A ethoxylate dimethacrylate, bisphenol F ethoxylate diacrylate, isocyanate acrylate, urethane acrylate, branched hexa-functional aliphatic urethane acrylate, ethylene glycol diacrylate, di(ethylene glycol) diacrylate, tetra(ethylene glycol) diacrylate, 1,4-butanediol diacrylate, hydroxy ethylmethacrylate, 3,4-epoxy-cyclohexyl-methyl methacrylate (METHB), triethylene glycol dimethacrylate (TEGDMA), tertiobutyl cyclohexanol methacrylate, 1,6-bis[2-(methacryloyloxy) ethoxycarbonylamino]-2,4,4-trimethylhexane (UDMA), 3,3,5-trimethyl cyclohexanol methacrylate, and dipentaerythritol penta-/hexa-acrylate.

13. The method of claim 12, wherein said mixing and polymerizing steps further comprise a component selected from the group consisting of an additive, a rheology modifier, and combinations thereof.

14. The method of claim 12, wherein said mixing step further comprises ultrasonicating at a frequency of at least 20 kHz for 15 minutes.

15. The method of claim 12, wherein in said polymerizing step, said UV light is generated from a UV LED array panel light source or a UV tubular light source.

16. The method of claim 15, wherein when said UV LED array panel light source is used, the uniformity of the angular selectivity of said polymer resin is in the range of 80% to 95%.

17. The polymer composition of claim 1, wherein a weight percent ratio of a sum of said (meth)acrylate monomer(s) or oligomer(s), said phase separating agent, said photoinitiator, and said photosensitizer is in a range of 90:4:1:0.1 to 60:30:1:0.1.

* * * * *

UNITED STATES PATENT AND TRADEMARK OFFICE
CERTIFICATE OF CORRECTION

PATENT NO. : 12,269,909 B2
APPLICATION NO. : 17/413120
DATED : April 8, 2025
INVENTOR(S) : FuKe Wang It is certified that error appears in the above-identified patent and that said Letters Patent is hereby corrected as shown below:

In the Specification

At Column 6, Line 31, "5,5'-Methylenebis(2-hydroxy-4-methoxybenzophenone)" should be -- 5,5'-methylenebis(2-hydroxy-4-methoxybenzophenone)" --.

At Column 6, Line 40, "Tris(2,4-di-tert-butylphenyl)phosphite" should be -- tris(2,4-di-tert-butylphenyl)phosphite --.

In the Claims

At Column 16, Line 1, "5,5'-Methylenebis(2-hydroxy-4-methoxybenzophenone)" should be -- 5,5'-methylenebis(2-hydroxy-4-methoxybenzophenone)" --.

At Column 17, Line 14, "Quinone," should be -- quinone, --.

Signed and Sealed this
Twelfth Day of August, 2025

Coke Morgan Stewart
*Acting Director of the United States Patent and Trademark Office*